United States Patent Office 3,168,694
Patented Feb. 2, 1965

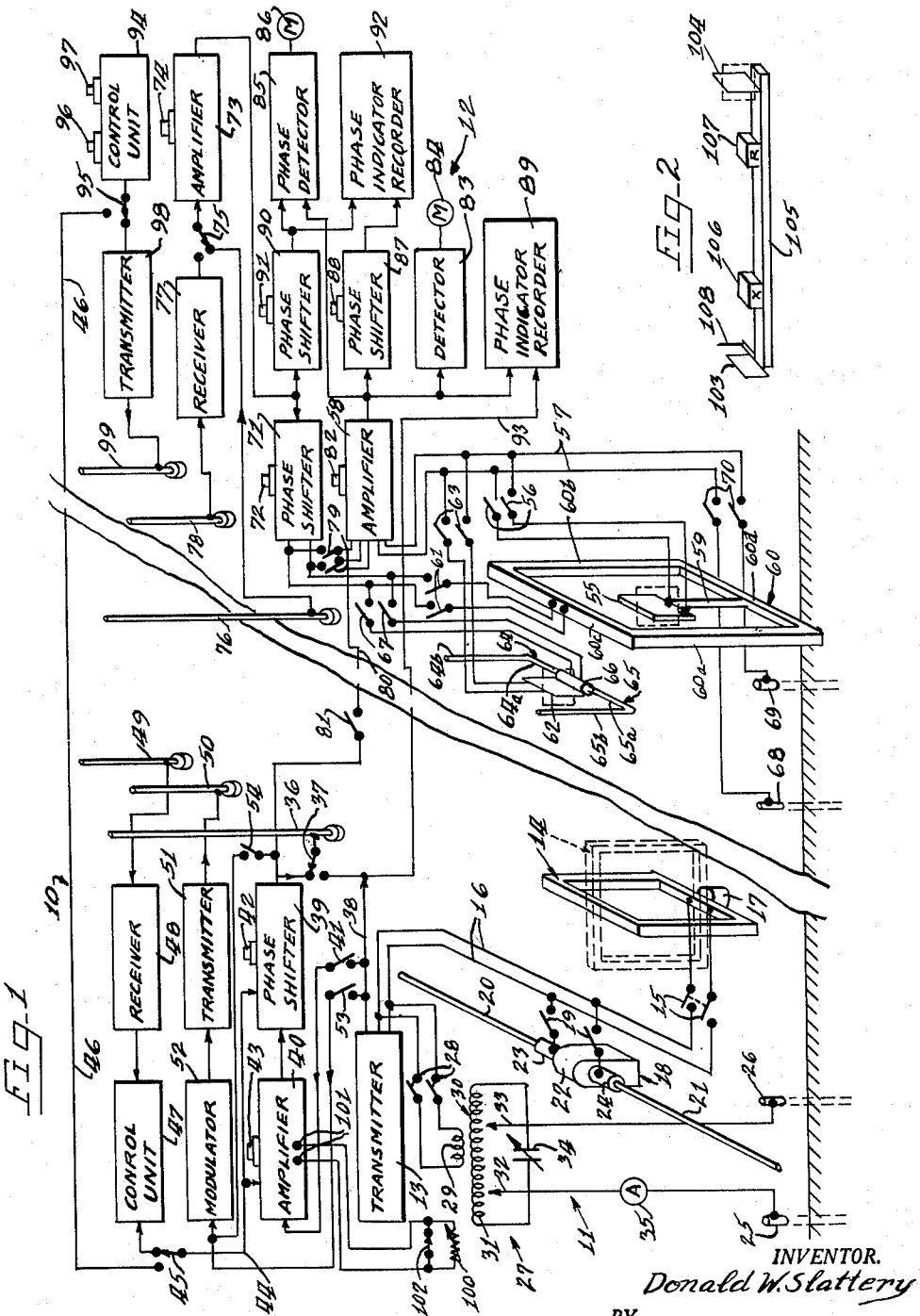

3,168,694
GEOPHYSICAL SURVEY SYSTEMS USING POLARIZED ELECTROMAGNETIC WAVES
Donald W. Slattery, Rte. 2, Box 195B, Loveland, Colo.
Filed July 24, 1961, Ser. No. 126,115
8 Claims. (Cl. 324—6)

This invention relates to geophysical survey systems and more particularly to improved systems using electromagnetic waves wherein the possibility of error in measurement is minimized to permit more accurate and more sensitive determination of the character of underground formations.

This application is a continuation-in-part of my copending application entitled "Geophysical Survey Apparatus and Method of Prospecting," filed June 15, 1953, U.S. Serial No. 361,739, now Patent No. 2,994,031, issued July 25, 1961.

As disclosed in my aforesaid copending application, the nature of subterranean earth structure is investigated by transmitting electromagnetic waves into the earth at one point, receiving waves emanated from the earth at another point, and comparing the relative amplitudes and the relative timed or phase relation of the transmitted and received waves. I have found that to obtain a sensitive, accurate and reliable measurement, it is necessary to minimize the effect of direct radiations from the transmission point to the reception point, which can be quite intense to obliterate the comparatively weak signal transmitted through the earth. As disclosed and claimed in my copending application, neutralizing means are provided for balancing out the effect of the portion of the waves which are not affected by variations in the subterranean earth structure.

This application is directed to features disclosed but not claimed in my copending application and to improvements on the systems disclosed in my copending application.

An important feature of the present invention relates to the use of a horizontal dipole antenna for transmission of waves, and to the construction thereof with loading coils to minimize the required length thereof.

Another important feature of the invention relates to the use of a certain spacing between transmitting and receiving antennas under certain conditions of operation, to obtain improved results.

A further feature of the invention relates to an arrangement for determining whether a change in an output indication is caused by an increase or decrease in conductivity of the subterranean earth structure.

Still another feature of the invention relates to the simultaneous use of a plurality of transmitting antennas in a particular fashion, to obtain improved results in the sensitivity and accuracy of measurement.

A still further feature of the invention relates to an arrangement wherein transmitting and receiving antennas are maintained in fixed relation while traversing a survey path.

Another important feature of the invention relates to the development of a neutralizing signal which is transmitted by means of a modulated high frequency signal.

A further feature of the invention relates to remote control means for controlling operation of the transmitter from the receiver location.

Still another important feature of the invention relates to the transmission of waves through the earth by means of antenna means conductively coupled to the earth.

This invention contemplates other objects, features and advantages which will become more fully apparent from the following detailed description taken in conjunction with the accompanying drawing which illustrates preferred embodiments and in which:

FIGURE 1 is a view illustrating diagrammatically a complete transmitting and receiving system constructed according to the principles of this invention; and FIGURE 2 is a view illustrating diagrammatically an arrangement for holding transmitting and receiving antennas in fixed relation while traversing a survey path.

Referring to FIGURE 1, reference numeral 10 generally designates a geophysical survey system constructed according to the principles of this invention. In general, the system 10 comprises a transmitting section 11 for transmitting electromagnetic waves into the earth at one point and a receiving section 12 for receiving waves emanated from the earth at another point, the character of the subterranean earth structure being determined by measurement of the relative amplitude and the relative time or phase relation of the transmitted and received signals.

In the system as diagrammatically illustrated, the transmitting section 11 comprises three main antennas which are connectable to a transmitter 13, to transmit waves into the earth. The antennas may be used selectively or in combination. In particular, a loop antenna 14 is provided which is connected through switch contacts 15 to output lines 16 from the transmitter 13. The antenna 14 as illustrated is mounted on a support 17 for rotation about a vertical axis from a full line position as illustrated in which its axis extends toward the receiving section to a dotted line position in which its axis is at right angles to a line extending toward the receiving section. The loop antenna 14 might also be mounted parallel to the ground, in some conditions of operation.

The second main transmitting antenna is in the form of a horizontal dipole antenna 18 which is connected to the conductors 16 through switch contacts 19. The horizontal dipole 18 comprises a pair of rods 20, 21 projecting horizontally in opposite directions from a support 22. An important feature is in the provision of a pair of loading coils 23 and 24 connected in series with the rods 20 and 21, between the inner ends thereof and the connections to the switch contacts 19. Through the use of the coils 23, 24, the required length of the horizontal dipole antenna may be minimized.

The third transmitting antenna comprises a pair of probes 25 and 26 which are inserted vertically into the earth, preferably along a line extending toward the receiving section. The probes 25 and 26 are connected to the transmitter output lines 16 through an impedance matching circuit 27 and switch contacts 28. The impedance matching section 27 comprises a primary coil 29 of a transformer 30 connected to the contacts 28 and a secondary coil 31 having a pair of taps 32 and 33 connected to the probes 25 and 26. A capacitor 34 is connected across the secondary coil 31, to tune the circuit into resonance at the frequency of operation of the transmitter 13. By adjustment of the positions of the probes 32 and 33, an optimum transfer of energy from the transmitter 13 into the earth may be accomplished. An ammeter 35, connected in series with one of the probes, may be used in adjustment of the circuit.

In addition to the three main transmitting antennas, the transmitting section 11 comprises a first auxiliary antenna in the form of a vertical rod antenna 36 adapted for transmission of vertically polarized waves to the receiving section. The antenna 36 may be selectively connected through a switch 37, either directly to an output line 38 of the transmitter or to the output of an adjustable phase shifter 39 connected to the output line 38 through an amplifier 40 and a switch 41. The phase shifter 39 has a manual adjustment control 42 and the amplifier 40 has a manual gain control 43. In addition, the operation of the phase shifter 39 and the amplifier 40 may be remotely controlled from the receiver section.

In particular, as illustrated diagrammatically, a control cable 44 is connected through a switch 45 either to a control cable 46 which extends to the receiving section, or to the output of a control unit 47 which responds to the output of a receiver 48 connected to a receiving antenna 49 to receive radio wave control signals from the receiver section.

The transmitter section 11 also includes another auxiliary antenna 50 adapted to transmit reference signals to the receiver section 12 at a frequency different from the frequency of operation of the transmitter 13, preferably at a much higher frequency. The auxiliary antenna 50 is connected to the output of a high frequency transmitter 51 which is controlled by a modulator 52 having an input connected to the output of the transmitter 13 through a switch 53 or to the output of the phase shifter 39 through a switch 54.

The illustrated receiver section 12 also has three main receiving antennas for receiving waves from the earth. The first antenna comprises a loop 55 which is connected through switch contacts 56 to conductors 57 connected to input terminals of an amplifier 58. To balance out or neutralize the effects of certain waves transmitted directly from the transmitter section, the loop 55 is supported on a support 59 within a loop 60 to which signals may be applied through switch contacts 61. The loop 60 is provided specifically for the purpose of minimizing the effect of vertically polarized waves picked up by the loop 55. This is accomplished by the inductive coupling between the vertical legs 60a and 60b of the loop 60 and the adjacent vertical legs of the loop 55. As described hereinafter, a current is caused to flow through the loop 60 of sufficient amplitude and of the proper phase to cancel out the effect of vertically polarized waves picked up by the loop 55. To minimize the effect with respect to horizontally polarized waves, the upper and lower legs 60c and 60d of the neutralizing loop 60 are preferably shielded.

The loop 55 in its full line position as illustrated has its axis extending toward the transmitter section, but is preferably rotatable about a vertical axis to a dotted line position as illustrated in which its axis is at right angles to a line extending toward the transmitter section. For this purpose, the loop 55 may be rotatably mounted on the support 59 or, in some cases, it is desirable to also rotate the compensating loop 60 through 90°, in which case the loop 55 may be fixed relative to the loop 60 and the entire assembly may be rotated about a vertical axis. It should also be pointed out that the loop 55 may in some cases be disposed in a horizontal plane.

The second main receiving antenna comprises a loop 62 similar to the loop 55, connected to the conductors 57 through switch contacts 63. To minimize the effect of vertically polarized waves on the loop 62, a neutralizing structure is provided having a configuration similar to that of an adcock antenna. In particular, a pair of rods 64 and 65 extend outwardly from a support 66 underlying the loop 62, the inner ends of the rods 64 and 65 being connectable to an energizing source through switch contacts 67. The rods 64 and 65 have horizontal portions 64a and 65a and vertical portions 64b and 65b extending upwardly from the outer ends of the horizontal portions 64a and 65a. In this arrangement, the horizontal portions 64a and 65a are shielded to minimize the effect on horizontally polarized waves picked up by the loop 62, while the vertical portions 64b and 65b are unshielded with sufficient excitation applied thereto to cancel out the effect of vertically polarized waves on the loop 62.

The third main receiving antenna comprises a pair of rods or probes 68 and 69 inserted vertically into the earth, preferably along a line extending toward the transmitter section, to be colinear or parallel with the line of the probes 25 and 26. The probes 68 and 69 are connected to the amplifier input lines 57 through switch contacts 70.

To develop the neutralizing or balancing currents in the loop 60 of the first antenna or in the rods 64 and 65 of the second antenna they are connected through the switch contacts 61 or through the switch contacts 67 to the output of an adjustable phase shifter 71 having a manual adjustment knob 72. Phase shifter 71 is connected to the output of an amplifier 73 having a manual gain control knob 74. The input of amplifier 73 is connected through a selector switch 75 either to a vertical rod antenna 76 which receives waves from the antenna 36 of the transmitter section, or to the output of a receiver 77 which is connected to an antenna 78 to receive high frequency signals from the antenna 50 of the transmitter section, the receiver 77 serving to detect or demodulate such high frequency signals and produce signals having an amplitude, phase and frequency corresponding to that of the transmitter 13. In general, the amplifier and phase shifter controls 74 and 72 may be adjusted to apply the proper neutralizing signals to the antennas, as will be described in detail hereinafter.

Instead of, or in addition to, applying compensating signals to the outer loop 60 of the first antenna and the rods 64, 65 of the second, a signal may be directly applied from the output of the phase shifter 71 to an input mixing circuit of the amplifier 58 through switch contacts 79. In addition, a signal may be applied to an input mixing circuit of the amplifier 58 directly from the transmitter section through a line 80 connected to the output of the phase shifter 39 through a switch 81.

The amplifier 58, which may have a manual gain control knob 82 has its output connected to the input of a detector 83 which energizes a meter 84. In addition, the output of the amplifier 58 is connected to a phase detector or discriminator 85 which energizes an indicator-meter 86, to a phase shifter 87 having a control knob 88 and to one input of a phase indicator-recorder 89. The phase detector or discriminator 85 has a second input connected to the output of a phase shifter 90 having a manual control knob 91 and having its input connected to the output of the amplifier 73. The phase shifter 87 has its output connected to one input of a phase indicator-recorder instrument 92, the other channel thereof being connected to the output of the phase shifter 90. The phase indicator-recorder 89 has a second input channel which may be connected through a line 93 to an output of the transmitter 13.

To remotely control the amplifier 40 and phase shifter 39 of the transmitter section, control signals may be applied from a control unit 94 through a switch 95 to the cable 46, the control unit having manual control knobs 96 and 97 for respectively controlling operation of the phase shifter 39 and the amplifier 40. In the alternative, the output of the control unit 94 may be applied to modulate a transmitter 98 which energizes an antenna 99 to transmit signals to the antenna 49 to be demodulated by the receiver 48 and to control the control unit 47 so as to control the phase shifter 39 and the amplifier 40.

A great many different modes of operation are possible with the system 10 as above described. Some of the more important and most effective modes of operation will now be described, but it should be understood that many other modes are possible, using the principles of the invention. It should be also noted that for any particular mode of operation, not all of the illustrated components are required and in some cases, the system can be made quite simple, and yet very effective.

As an example of one method of operation of the system 10, the transmitter 13 may be connected to the loop antenna 14 by closing the switch contacts 15 and the receiving loop 55 may be connected to the amplifier 58 by closing contacts 56. A portion of the waves picked up by the receiving loop 55 will be affected by the character of the subterranean earth structure between the transmitting and receiving antennas. However, a portion of the waves picked up by the receiving loop 55 will not be affected by the character of the subterranean earth structure, and the effect of such direct radiations may completely obliterate the comparatively weak signal transmitted through the earth. To neutralize the effect of the portion of the waves which are not affected by variations in the subterranean earth structure, a balancing current is applied to the outer loop 60 proportional in magnitude to vertically polarized waves received from the transmitter section and having a phase relation such as to provide a proper balance. In particular, the loop 60 is connected through the switch contacts 61 to the output of the phase shifter 71 which is connected to the output of the amplifier 73, the input of the amplifier 73 being connected through the switch 75 to the vertical rod antenna 76. The controls 72 and 74 may then be adjusted until a proper balance is achieved. This may be accomplished on a trial and error basis, although a more accurate method is available as will be described hereinafter.

Once the proper balance is obtained, the meter 84 at the output of the detector 83 will indicate the magnitude of waves transmitted through the earth. The phase of the waves may be determined by various methods. In particular, the manual phase shift control 72 may be calibrated and it may be moved from its balance position to a position such as to produce a null indication of the meter 84, with the angular difference between such positions being then an indication of phase. The amplifier control 74 or the amplifier control 82 may be adjusted in obtaining such a null indication but both should of course be returned to the positions thereof at which the proper neutralization was obtained.

Instead of adjusting the phase shifter 71, the phase may be determined from the indication on the meter 86 at the output of phase detector 85 which responds to the output of the amplifier 58 and the output of the phase shifter 90 connected to the output of the amplifier 73. In making this measurement, the phase shifter 90 may be set to a zero phase shift position, but in many cases it is desirable to set it at a position such as to cause a certain phase shift. For example, the characteristics of the subterranean earth structure in a particular region may give rise to a certain phase shift, say 50°, where there are no formations which might give rise to the presence of oil or gas, but a much different phase indication might be obtained where such formations occur. The phase shifter 90 might then be adjusted to produce a balancing phase shift of 50°, so that the meter 86 would normally read zero, while any substantial indication thereon would then indicate the presence of such an underground formation.

The phase indicator-recorder 92 may also be used, its inputs being connected to the output of the phase shifter 90 and to the output of the phase shifter 87. Here again, it may be desirable to set the phase shifters at certain positions in order to obtain an indication or recording which may be more easily analyzed.

The phase indicator-recorder 89 may also be used, its inputs being connected to the output of the amplifier 58 and to the direct line 93 to the transmitter 13. With this phase indicator-recorder, a more absolute indication or recording is obtained.

As a modification on the above method of operation, the transmission may be effected with the loop antenna 14 rotated either about a horizontal or about a vertical axis to another position such as, for example, a position as illustrated in dotted lines, or a position in a plane parallel to the ground. As another modification, the transmission may be effected with the dipole antenna 18, by closing the switch contacts 19. With the horizontal dipole antenna 18, a strong horizontally polarized wave is transmitted through the earth. In addition, it is found that a vertically polarized wave is transmitted to the receiver section, which may be neutralized in the manner as above described. The loading coils 23, 24 are important in producing the strong horizontally polarized wave while minimizing the required length of the antenna elements.

As a further modification, the probes 25, 26 may be used, with the contacts 28 being closed. In this operation, the coil taps 32, 33 may be adjusted to obtain an effective impedance match, the ammeter 35 being used in making the adjustment.

Ordinarily, only one transmitting antenna need be used, but it is possible also to use any two or all three of the antennas in combination.

As shown, the neutralizing loop 60 and the loop 55 are disposed in the same plane which is transverse to a line extending to the transmitter section. However, the loops may be rotated about a vertical axis to a position at right angles to the position shown, or at some intermediate position, if desired.

In place of the loop 55 and the compensating loop 60, the loop 62 and the compensating rods 64, 65 may be used, by closing the contacts 63, 67, and it will be appreciated that the operation is substantially the same and also that the antenna elements may be rotated about a vertical axis to a position at right angles to that shown or at some intermediate position, without affecting the general mode of operation.

Instead of using the compensating loop 60 or the compensating elements 64, 65, a compensating or neutralizing signal may be applied directly to the input mixer circuit of the amplifier 58, by closing the contacts 79. In such operation, either the loop 55 or the loop 62 may be used, and it is also possible to use the probes 68, 69, by closing the contacts 70.

It is possible to obtain much more accurate neutralization by using the vertical rod antenna 36. In particular, the switch 37 may be positioned to connect the vertical rod antenna 36 to the transmitter 13, while the other transmitting antennas are disconnected. In such operation, the only wave transmitted to the receiver section is a vertically polarized wave. Then, with the switch 75 positioned to connect the amplifier 73 to the antenna 76, and with the phase shifter 71 connected to the neutralizing loop 60, the neutralizing elements 64, 65, or directly to the amplifier 58, the phase shifter control 72 and the amplifier control 74 may be adjusted to obtain a null output from the detector 83 as indicated on the meter 84. Thereafter, the vertical rod antenna 36 may be disconnected from the transmitter 13 and one or more of the main transmitter antennas may be used in the manner as described above. It will be appreciated that any of the above indicating operations may also be used. With this operation, it is possible to obtain very exact neutralization.

In some cases, it is desirable to leave the vertical rod antenna connected to the transmitter 13 while one or more of the main transmitter antennas is used. This does not affect the neutralization but results in a stronger directly transmitted wave, which may be used for comparison purposes.

Another method of obtaining more exact neutralization is by closing the switch 53 to use the antenna 50 which is energized by the high frequency transmitter 51 controlled by the modulator 52 from the output of the transmitter 13. In this operation, the input of the amplifier 73 is connected to the output of the receiver 77 through the switch 75. The phase shifter control 72 and the amplifier control 74 may then be adjusted to obtain a null output from the detector 83 as indicated by meter 84. Here again, any of the above described transmitter antennas and receiving antennas, or combinations threof, may be used.

Still another method of obtaining accurate neutralization is by developing a signal at the transmitter to neutralize the signal which might otherwise be directly radiated. In particular, the switch 41 may be closed and the switch 37 may be positioned as illustrated, to apply a signal to the antenna 36 through the amplifier 40 and the phase shifter 39. One or more of the main transmitter antennas may be used simultaneously. The amplifier control 43 and the phase shifter control 42 may then be adjusted to obtain neutralization of the signal which might otherwise be radiated directly from the transmitter section to the receiver section. It should be understood that either the loop 55, the loop 62 or the probes 68, 69 may be used but, of course, it is not necessary to use the neutralizing loop 60, the neutralizing elements 64, 65 or the connection of phase shifter 71 to the input of amplifier 58.

In this method of neutralization, the amplifier 40 and the phase shifter 39 may be controlled from the controls 96, 97 at the receiver section, using either the direct line 46 or the radio wave signal transmitted from antenna 99 to antenna 49 and applied through the receiver 48 to the control unit 47.

When using the amplifier 40 and phase shifter 39 in making such neutralization, it is possible to use a special feature of the invention in determining whether a change in indication is caused by an increase or a decrease in earth conductivity. In particular, a gain control 100, in the form of a rheostat, is connected to terminals 101 of the amplifier 40 to decrease the gain of the amplifier in proportion to the resistance of the rheostat 100, but the rheostat 100 is normally shorted out by a switch 102. If after moving to a new location, a change in the output indication is obtained, the switch 102 may be opened to decrease the amplifier gain. If the output signal increases it indicates that the conductivity of the earth has increased but if the output signal decreases, it indicates that the conductivity of the earth has decreased.

Another method of obtaining neutralization makes use of a direct connection between the transmitter and receiver sections, using the line 80 with the switch 81 being closed. The switch 41 may be closed to apply a signal to the line 80 through the amplifier 40 and phase shifter 39, and the controls 43, 42 may then be adjusted to obtain proper neutralization. In the alternative, the amplifier 40 and phase shifter 39 may be remotely controlled from the unit 94, either through the line 46 or through the radio wave signal transmitted from antenna 99 to antenna 49. As another alternative, a signal may be applied over a direct line from the transmitter to the input of the amplifier 73 so as to use the amplifier 73 and phase shifter 71 at the receiver section. In this case, the neutralizing signal may be applied either to the loop 60 or the elements 64, 65, as well as to the input of the amplifier 58, as desired.

Another method of obtaining neutralization involves the positioning of transmitting and receiving antennas at certain spacing and at certain relative angles. In particular, the transmitting loop 14 is positioned as shown in a plane at right angles to a line extending to the receiver antenna. The receiver antenna, either the loop 55 or the loop 62, is located approximately in a plane extending toward the transmitter antenna, as shown in dotted lines. It is found that effective neutralization can be obtained with the transmitting and receiving antennas being so positioned and with the spacing therebetween being slightly greater than one wave length. This distance is critical and field adjustments should be made to obtain the best results. To aid in obtaining accurate neutralization, the transmitter may be first connected to a vertical rod antenna, such as antenna 36 while the receiving antenna is rotated until a minimum reading is obtained at the output of detector 83, as observed on the meter 84. The transmitter may then be switched over to the loop antenna.

In all of the foregoing methods, it is desirable that the relative positions of the transmitting and receiving antennas be fixed while moving one or the other or both to traverse a survey path. If the antennas are a large distance apart, suitable instruments such as surveying instruments, magnetic compasses, radio compasses, radar, loran, etc. may be used. To permit rapid survey, an arrangement as diagrammatically illustrated in FIGURE 2 may be used. As shown, a transmitting antenna in the form of a loop 103 and a receiving antenna in the form of a loop 104 are fixed to opposite ends of a rigid support structure 105, the antennas 103 and 104 being connected to transmitting and receiving instruments 106 and 107. A vertical rod antenna 108 may also be connected to the transmitting instrument. With this arrangement, the structure 105 may be moved as desired to traverse a survey path, and the antennas are maintained in fixed relative positions. For example, the structure 105 may be carried on an automobile, or on an airplane or helicopter. Any of the above-described neutralization methods may be employed.

It will be understood that modifications and variations may be effected without departing from the spirit and scope of the novel concepts of this invention.

I claim as my invention:

1. In a geophysical survey system, transmitter and receiver sections located at horizontally spaced points relative to the earth's surface, said transmitter section including a main transmitter having a certain operating frequency, at least one main antenna coupled to said transmitter and arranged to transmit horizontally polarized waves into the earth, an auxiliary transmitter having an operating frequency substantially higher than said certain operating frequency, an auxiliary antenna coupled to said auxiliary transmitter, a modulator for modulating the output of said auxiliary transmitter, means coupling said main transmitter to said modulator to modulate the output of said auxiliary transmitter in accordance with the output of said main transmitter, said receiver section including a main antenna, amplifier and detector means coupled to said main antenna, an auxiliary receiving antenna responsive to waves emanated from said auxiliary transmitting antenna, auxiliary detector means coupled to said auxiliary receiving antenna, and coupling means coupling the output of said auxiliary detector means to said amplifier and detector means of said receiver section, one of said coupling means including amplifier and phase shifter means, and means for adjusting said amplifier and phase shifter means to neutralize the effect of waves transmitted directly from said main transmitter antenna to said main receiver antenna.

2. In a geophysical survey system as defined in claim 1, said amplifier and phase shifter means being located in said transmitter section, and radio wave remote control means including a control unit in said receiver section arranged for operating said means for adjusting said amplifier and phase shifter.

3. In a geophysical survey system as defined in claim 1, said amplifier and phase shifter means being located in said receiver section.

4. In a geophysical survey system, transmitter and receiver sections located at horizontally spaced points relative to the earth's surface, said receiver section including an antenna and amplifier and detector means coupled to said antenna, said transmitter section including a transmitter, at least one main antenna coupled to said transmitter and arranged to transmit horizontally polarized waves into the earth, and means for neutralizing the effect of waves transmitted from said main transmitting antenna to said receiving antenna including an auxiliary transmitting antenna arranged to emanate vertically polarized waves, amplifier and phase shifter means in said transmitter section arranged to apply a signal from said transmitter to said auxiliary antenna, and means for adjusting said amplifier and phase shifter means to produce a minimum output from said receiver detector means.

5. In a geophysical survey system, transmitter and receiver sections located at horizontally spaced points relative to the earth's surface, said receiver section including an antenna and amplifier and detector means coupled to said antenna, said transmitter section including a transmitter, at least one main antenna coupled to said transmitter and arranged to transmit horizontally polarized waves into the earth, and means for neutralizing the effect of waves transmitted from said transmitting antenna to said receiving antenna including amplifier and phase shifter means in said transmitter section arranged to develop a balancing signal, means for adjusting said amplifier and phase shifter means to produce a minimum output from said receiver detector means, and means for changing the effective gain of said amplifier and phase shifter means to a certain extent when an output indication is obtained on said receiver detector means after neutralization to determine whether the output indication is produced by an increase or a decrease in the earth's conductivity.

6. In a geophysical survey system, transmitter and receiver sections located at horizontally spaced points relative to the earth's surface, said transmitter section including a main transmitter having a certain operating frequency, at least one main antenna coupled to said transmitter and arranged to transmit horizontally polarized waves into the earth, an auxiliary transmitter having an operating frequency substantially higher than said certain operating frequency, an auxiliary antenna coupled to said auxiliary transmitter, a modulator for modulating the output of said auxiliary transmitter, means coupling said main transmitter to said modulator to modulate the output of said main transmitter, said receiver section including a main antenna, amplifier and detector means coupled to said main antenna, an auxiliary receiving antenna responsive to waves emanated from said auxiliary transmitting antenna, auxiliary detector means coupled to said auxiliary receiving antenna, and coupling means coupling the output of said auxiliary detector means to said amplifier and detector means of said receiver section, one of said coupling means including amplifier and phase shifter means, means for adjusting said amplifier and phase shifter means to neutralize the effect of waves transmitted directly from said main transmitter antenna to said main receiver antenna, and means for changing the effective gain of said amplifier and phase shifter means to a certain extent when an output indication is obtained on said receiver detector means after neutralization to determine whether the output indication is produced by an increase or a decrease in the earth's conductivity.

7. In a geophysical survey system, transmitter and receiver sections located at horizontally spaced points relative to the earth's surface, said transmitter section including a transmitter, at least one main antenna connectable to said transmitter and arranged to transmit horizontally polarized waves into the earth, an auxiliary antenna coupled to said transmitter and arranged to transmit vertically polarized waves, said receiver section including a main antenna, amplifier means coupled to said main antenna, detector means coupled to said amplifier means, an auxiliary receiving antenna arranged to receive vertically polarized waves, phase measuring means for comparing the phase of signals derived from said amplifier means and said auxiliary antenna, and means for neutralizing the effect of waves radiated from said main transmitting antenna to said main receiving antenna including amplifier and phase shifter means coupled to said auxiliary receiving antenna, said amplifier and phase shifter means being adjustable to produce a null output from said detector means while transmitting only with said auxiliary transmitting antenna, said neutralizing means being thereafter effective with both said main and auxiliary antennas being coupled to said transmitter.

8. In a geophysical survey system using electromagnetic waves, a loop receiving antenna, amplifier and detector means coupled to said receiving antenna, a transmitter for generating power at a certain high frequency, a first transmitting antenna connectable to said transmitter and arranged to emanate substantially only vertically polarized waves at said certain high frequency, the plane of said loop receiving antenna being positioned vertically and approximately along a generally horizontal line extending between and intersecting central portions of said antennas to produce minimum reception of said vertically polarized waves emanated from said first transmitting antenna, and a second transmitting antenna connectable thereafter to said transmitter and located substantially in a plane transverse to said generally horizontal line to transmit horizontally polarized waves into the earth.

References Cited in the file of this patent

UNITED STATES PATENTS

| | | |
|---|---|---|
| 1,564,940 | Chapman | Dec. 8, 1925 |
| 1,765,438 | Meissner | June 24, 1930 |
| 1,838,371 | Deardorff | Dec. 29, 1931 |
| 2,077,707 | Melton | Apr. 20, 1935 |
| 2,172,688 | Barret | Sept. 12, 1939 |
| 2,283,897 | Alford | May 26, 1942 |
| 2,499,195 | McNiven | Feb. 28, 1950 |
| 2,542,462 | Beard | Feb. 20, 1951 |
| 2,731,596 | Wait et al. | Jan. 17, 1956 |